United States Patent
Kehlstadt et al.

(10) Patent No.: US 8,633,893 B2
(45) Date of Patent: *Jan. 21, 2014

(54) POINTING DEVICE WITH SOLID-STATE ROLLER

(71) Applicant: Logitech Europe S.A., Morges (CH)

(72) Inventors: Florian Max Kehlstadt, Aclens (CH); Berni Joss, Bussigny-pres-Lausanne (CH); Julien Piot, Rolle (CH); Marc Bidiville, Pully (CH); Laurent Plancherel, Lausanne (CH); Baptiste Merminod, Vevey (CH); Jean-Luc Dupraz, Eschandens (CH); Maxime Marini, Geneva (CH); Chiu Yu, Chung Li (TW)

(73) Assignee: Logitech Europe S.A., Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/738,816

(22) Filed: Jan. 10, 2013

(65) Prior Publication Data
US 2013/0215033 A1    Aug. 22, 2013

Related U.S. Application Data

(63) Continuation of application No. 13/455,412, filed on Apr. 25, 2012, now Pat. No. 8,373,676, which is a continuation of application No. 11/657,973, filed on Jan. 24, 2007, now Pat. No. 8,194,039, which is a continuation of application No. 10/025,838, filed on Dec. 18, 2001, now Pat. No. 7,170,488.

(60) Provisional application No. 60/258,133, filed on Dec. 22, 2000.

(51) Int. Cl.
  *G09G 5/00* (2006.01)
  *G06F 3/033* (2013.01)
  *G09G 5/08* (2006.01)
  *G06F 3/041* (2006.01)
  *G06F 3/045* (2006.01)
  *G06K 11/06* (2006.01)
  *G08C 21/00* (2006.01)
  *G06F 3/044* (2006.01)

(52) U.S. Cl.
  USPC ........... 345/163; 345/156; 345/157; 345/159; 345/164; 345/165; 345/166; 345/167; 345/173; 345/174; 178/18.01; 178/18.06

(58) Field of Classification Search
  USPC ......... 345/156, 157, 159, 163–167, 173, 174; 178/18.01, 18.06; 200/600
  See application file for complete search history.

(56) References Cited

U.S. PATENT DOCUMENTS 4,103,252 A   7/1978   Bobick
4,550,221 A   10/1985  Mabusth (Continued)

FOREIGN PATENT DOCUMENTS

WO    91/04526 A1    4/1991

*Primary Examiner* — Bipin Shalwala
*Assistant Examiner* — Ilana Spar
(74) *Attorney, Agent, or Firm* — Kilpatrick Townsend & Stockton LLP

(57) ABSTRACT

A solid-state roller on a pointing device with enhanced features. The solid-state design described herein allows the sensor to be placed on any shape of surface, such as one that has curvature in two directions. In one embodiment, a trench or downward curve contains sensors for detecting finger movement. The user's finger can thus bend about a knuckle in a curved motion to activate the sensor, requiring little or no movement of the finger up and down. The solid-state sensors can be of one of a number of designs. In one embodiment, multiple electrodes are contacted by a finger as it moves. Each electrode is coupled to a capacitive detection circuit, for detecting the change in capacitance as the electrode is contacted by the finger.

49 Claims, 13 Drawing Sheets

(56) References Cited

U.S. PATENT DOCUMENTS

| | | | |
|---|---|---|---|
| 4,977,397 A | 12/1990 | Kuo et al. | |
| 5,473,344 A | 12/1995 | Bacon et al. | |
| 5,508,700 A * | 4/1996 | Taylor et al. | 341/33 |
| 5,530,455 A | 6/1996 | Gillick et al. | |
| 5,555,894 A | 9/1996 | Doyama et al. | |
| 5,748,185 A * | 5/1998 | Stephan et al. | 345/174 |
| 5,771,030 A | 6/1998 | Suzuki et al. | |
| 5,771,038 A | 6/1998 | Wang | |
| 5,805,144 A | 9/1998 | Scholder et al. | |
| 5,943,052 A | 8/1999 | Allen et al. | |
| 5,956,019 A | 9/1999 | Bang et al. | |
| 6,157,369 A | 12/2000 | Merminod et al. | |
| 6,198,473 B1 | 3/2001 | Armstrong | |
| 6,262,717 B1 | 7/2001 | Donohue et al. | |
| 6,310,605 B1 | 10/2001 | Rosenberg et al. | |
| 6,331,855 B1 | 12/2001 | Schauser | |
| 6,429,851 B1 | 8/2002 | Vaghefi et al. | |
| 6,486,873 B1 | 11/2002 | McDonough et al. | |
| 6,507,093 B2 | 1/2003 | Kaneda et al. | |
| 6,545,667 B1 | 4/2003 | Lilenfield | |
| 6,587,093 B1 * | 7/2003 | Shaw et al. | 345/163 |
| 6,937,225 B1 | 8/2005 | Kehlstadt et al. | |
| 7,170,488 B2 | 1/2007 | Kehlstadt et al. | |
| 8,013,840 B1 | 9/2011 | McDonough et al. | |
| 8,194,039 B2 | 6/2012 | Kehlstadt et al. | |
| 8,373,676 B2 * | 2/2013 | Kehlstadt et al. | 345/174 |

\* cited by examiner

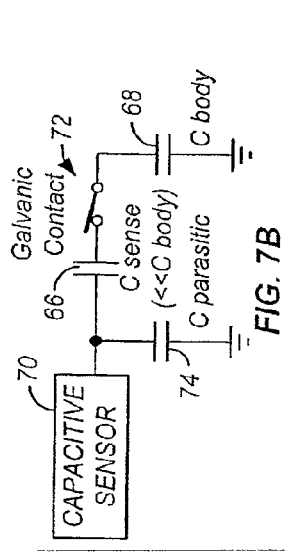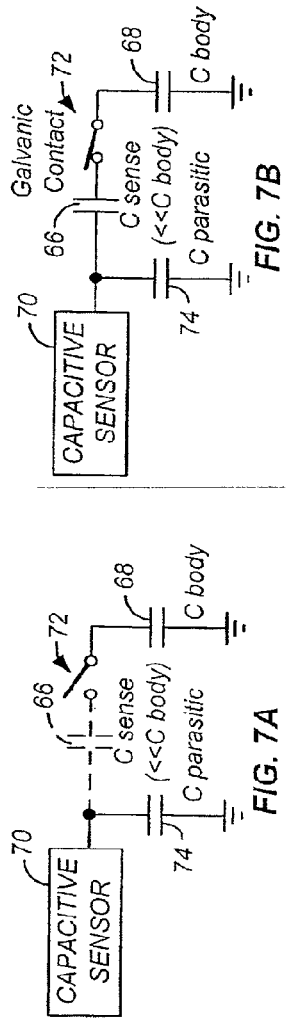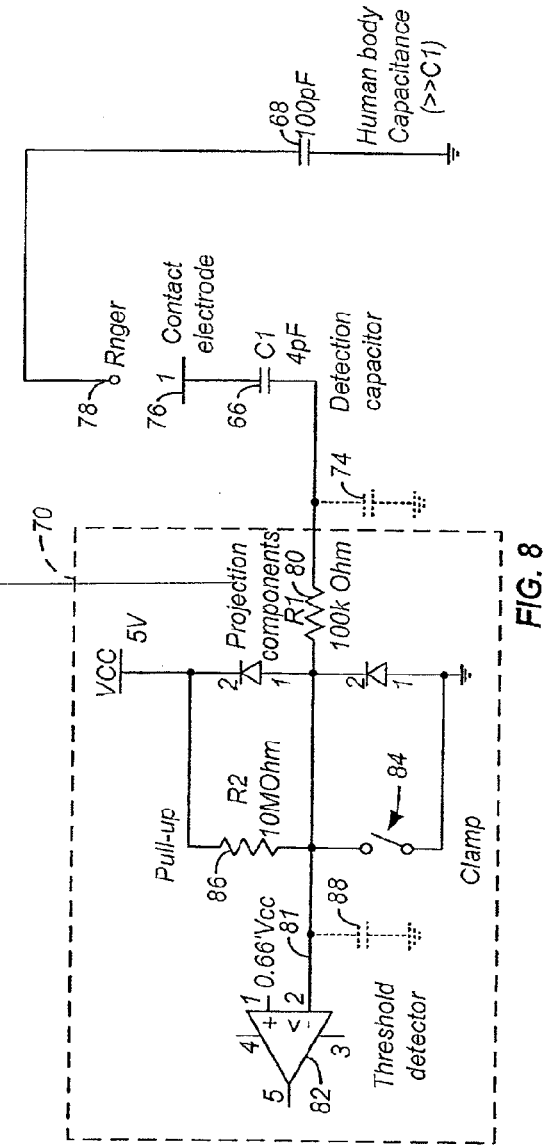

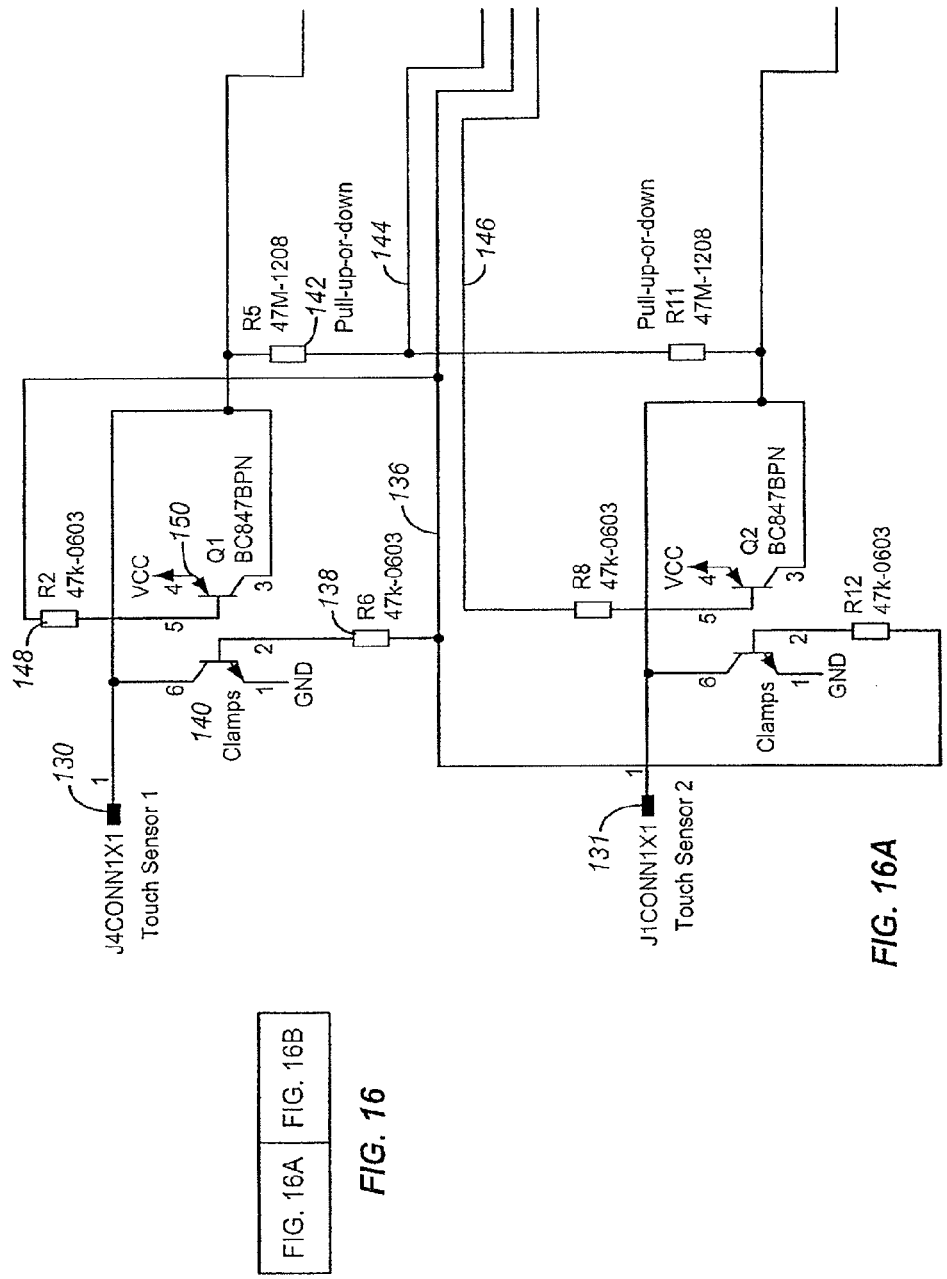

POINTING DEVICE WITH SOLID-STATE ROLLER

CROSS-REFERENCES TO RELATED APPLICATIONS

This application is a continuation of U.S. patent application Ser. No. 13/455,412, filed Apr. 25, 2012, which is a continuation of U.S. patent application Ser. No. 11/657,973, filed Jan. 24, 2007 (now U.S. Pat. No. 8,194,039), which is a continuation of U.S. patent application Ser. No. 10/025,838, filed Dec. 18, 2001 (now U.S. Pat. No. 7,170,488), which claims priority from U.S. Provisional Patent Application No. 60/258,133, filed Dec. 22, 2000, the disclosures of which are hereby incorporated by reference in their entirety.

BACKGROUND OF THE INVENTION

The present invention relates to a solid-state roller (with no moving parts) on a pointing device, such as a computer mouse.

A number of computer mice include a roller or wheel which can be rotated by a user's finger. Typically, such a roller is used for scrolling. One example is set forth in Logitech U.S. Pat. No. 6,157,369, and other examples are described in the background section of that patent. Some of the disadvantages of a roller are that it is a mechanical element, and thus subject to mechanical failure since it is susceptible to dirt and shock. In addition, its size can make it difficult to integrate into some form factors such as a very low profile mouse.

Other patents describing a roller or wheel include U.S. Pat. Nos. 5,530,455 and 5,473,344. U.S. Pat. No. 5,530,455 also describes determining the speed of scrolling in the mouse driver software, and switching between line scrolling and page scrolling depending on the speed.

Some earlier designs have proposed a touchpad on a mouse. U.S. Pat. No. 5,805,144 shows a touchpad with pressure sensing. The touchpad allows for sensing in only one direction, and also provides tactile feedback. Touchpads on a mouse are also shown in U.S. Pat. No. 5,711,038 and PCT Publication WO91/04526.

Another patent, U.S. Pat. No. 5,555,894, shows depressions for keys and the use of pressure sensors for detecting the bending of the fingers by using multiple sensors on a key to detect finger movement.

SUMMARY OF THE INVENTION

The present invention provides a solid-state roller on a pointing device with enhanced features. In one embodiment, a capacitive sensor is provided which uses galvanic linger contact. In particular, the finger on an electrode acts as a switch to connect ground, through the body, the body capacitance and a capacitance connected to the electrode. As the finger passes from one electrode to another, movement and direction is sensed. A unique differential detection circuit is also provided, which alternately clamps a node high and then low, allowing measurement of both capacitive charge-up and discharge, to compensate for interference.

The solid-state sensor allows multiple shapes to be used. Unlike a touchpad, which is practical to bend in only one direction, the solid-state roller can be on a surface with curvature in more than one direction. It can also be on either a concave or convex surface. In one embodiment, a convex trench or downward curve contains sensors for detecting finger movement. The user's finger can thus bend about a knuckle in a curved motion to activate the sensor, requiring little or no movement of the finger up and down. In another embodiment the sensor is on a convex surface, such as on a side for activation by the thumb.

The solid-state sensors can be of one of a number of designs. In one embodiment, multiple electrodes are contacted by a finger as it moves. Each electrode is coupled to a capacitive detection circuit, for detecting the change in capacitance as the electrode is contacted by the finger. In another embodiment, light from one side of a trench is blocked by the finger from reaching detectors on the other side of the trench, allowing detection of the movement of the shadow of the finger. Alternately, a reflective optical embodiment is used. In another embodiment, capacitive coupling of the finger is detected with three electrodes, one of which has a zigzag shape to allow variation in the amount of the capacitance as the linger moves along the zigzag.

In other embodiments of the invention, a fingerprint optical reader can be used to detect movement of a finger-print over a sensor window. The solid-state roller can also have a cross shape, to willow both vertical and horizontal scrolling.

In one embodiment, the speed of finger movement is determined in the pointing device, rather than in a software driver as in the prior art. The signal sent to the computer multiplies the number of transitions in accordance with the detected speed. This allows a single transition to speed up scrolling, rather than requiring multiple reports to a software driver.

Instead of the mechanical ratchet feedback of the prior art mechanical rollers, the present invention uses other forms of feedback. For example, a clicking sound emanates from a speaker mounted in the pointing device. By using a speaker in the pointing device, instead of the computer speaker, the latency is greatly improved, giving a realistic feedback. Alternately, lights could flash in the mouse. In one embodiment, a light used in the pointing device for decorative purposes can be flashed to indicate a notification to the user. One example would be an event being monitored by the user externally to the computer system, such as over the Internet, with the flashing light in the pointing device prompting the user.

For a further understanding of the nature and advantages of the invention, reference should be made to the following description taken in conjunction with the accompanying drawings.

BRIEF DESCRIPTION OF THE DRAWINGS

FIGS. 7A and 7B are block diagrams illustrating the operation of capacitive sensing.

FIG. 8 is a circuit diagram illustrating a capacitive sensing circuit with a clamp-down circuit.

DETAILED DESCRIPTION OF THE INVENTION

Curved Solid-state Roller

The solid-state roller of the invention allows the roller to be placed on any shape housing. A trench or other convex shape could be used. Alternately, a concave shape could be used. A concave shape could be used for placement of the sensor on the side of a mouse, for activation by a thumb. The solid-state design described herein allows the sensor to be placed on any shape of surface, such as one that has curvature in two directions. Thus, it could simply track the contour of the mouse or other pointing device. This allows a pointing device to be designed for aesthetic or ergonomic reasons, and a solid-state roller can be added without requiring the shape to change.

Various shape implementation are covered in the invention. A curved trench with curvature matched to the hand creates a support surface that is lower than that of the two neighboring surfaces. This reduces the strain on the scrolling finger. Alternatively, the three middle finger tips rest over support surfaces having all similar heights, but the tip of the scrolling finger, when scrolling and leaving its original rest position, will travel over a trajectory that is below the plane defined by the two neighboring lingers, by entering a support surface in recess with this plane. For example, the scrolling finger lip follows a trajectory defined by the rotation of the finger around its middle joint.

Figure 1:
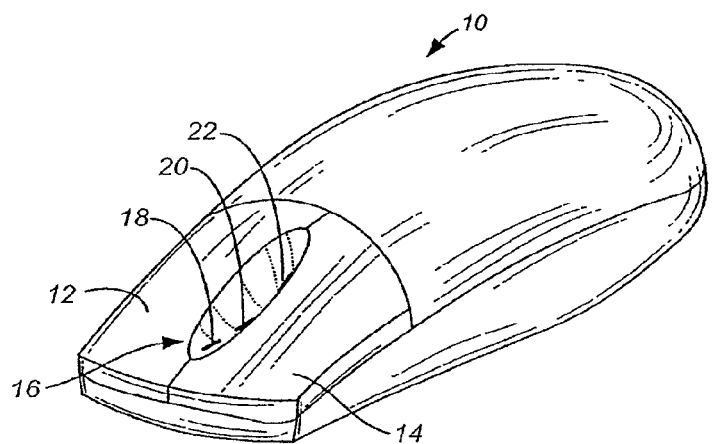
FIG. 1 is a perspective view of a mouse with a solid-state sensor trench according to one embodiment of the invention.

FIG. 1 is a perspective view of a mouse 10 having buttons 12 and 14. In-between the buttons is a convex area, or trench, 16 which can receive a user's finger. At the bottom of the trench are electrodes 18, 20 and 22. The movement of a user's finger either forward to back, or back to forward can be detected (as will be described later), and appropriate scrolling or other signals can be sent to a host computer. Alternately, other solid-state sensors than the electrodes shown could be used. For example, light emitters could be mounted on one side of the trench, with detectors on the other side, and the trench being transparent or translucent.

Figure 2:
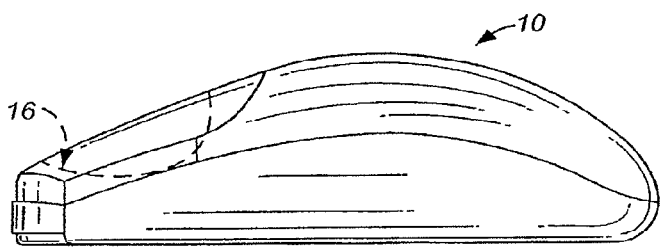
FIG. 2 is a side view of the mouse of FIG. 1.

FIG. 2 is a side view of mouse 10 of FIG. 1. Shown in phantom is the outline of the bottom of trench 16. As can be seen, the bottom follows a curvature, starting out at the front at a particular level, becoming deeper, and then becoming more shallow towards the back of the mouse. In one embodiment, this curvature traces the arc of a typical user's finger bending about the second knuckle while the hand is on the mouse. The second knuckle is the second knuckle away from the tip of the finger. The curvature in one embodiment takes into account the slight bending of the first knuckle as well, but with more than ⅔ of the bending movement (dictating the shape of the arc) coming from the second knuckle. In one embodiment, the arc of the trench is matched to the curving of the index finger or forefinger. This arc eliminates the need for the user to lift the finger up to activate a roller. Alternately, the arc can be less steep, requiring a slight lifting of the finger as well, but less lifting than what is required for a mechanical roller or a solid-state touchpad on a surface without a trench.

Figure 3:
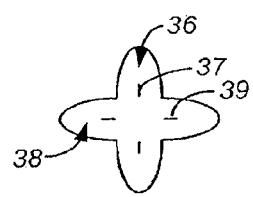
FIG. 3 is a diagram of a cross-shaped trench for horizontal and vertical scrolling in an embodiment of the invention.

FIG. 3 is a diagram illustrating a dual-trench arrangement in which a vertical trench 36 is provided for up and down scrolling movement, while a horizontal trench 38 intersects with it for horizontal scrolling movement. Electrodes such as electrodes 37 and 39 can be used to detect finger movement in both directions.

In another implementation, the finger rests in a trench wide enough to accommodate the finger, but not too wide in order to guide the finger in the direction of detection. Position detection is achieved with help of an array of light sources, or a single distributed light source, on one of the trench sides, and an array of light detectors located on the other side. Presence of the finger in the trench is detected from the reduced response in the detector directly facing the finger, or from combining responses from all detectors and determining by interpolation its minimum. Alternatively, a binary response from the light detector, either absolute ("light is above or below a given threshold, include hysteresis"), or relative with neighboring detector ("light is larger/smaller by a given factor than neighbor, include hysteresis") can be used. Similarly as in the previous electrode implementation, motion can then be computed based on the "on-off" and "off-on" transition timings with correct relative phase shifts.

Integration with Other Elements of a Mouse

Figure 4:
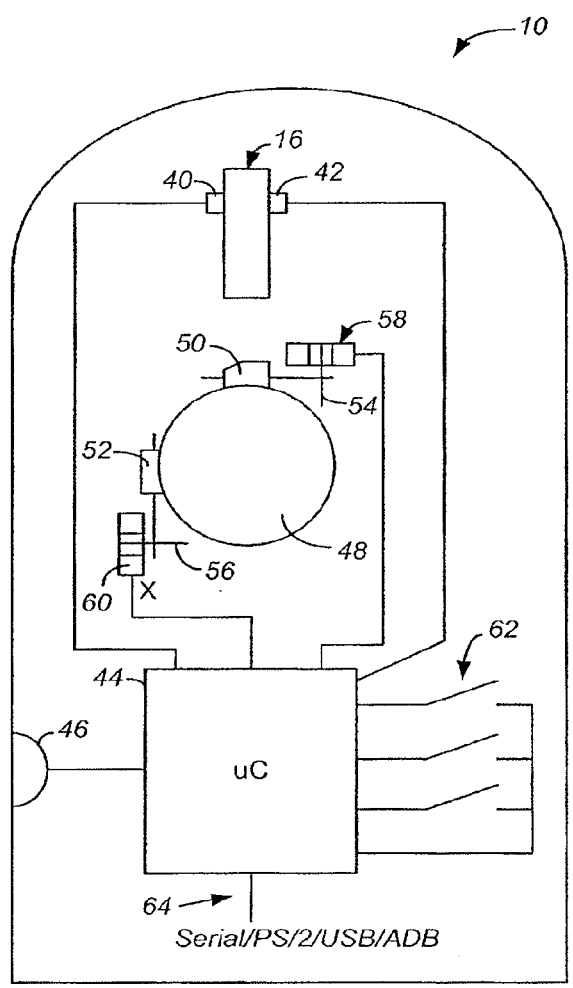
FIG. 4 is a diagram illustrating the pointing sensor apparatus in conjunction with the solid-state roller, and a speaker, in one embodiment of the invention.

FIG. 4 is a diagram illustrating some of the internal components of a mouse 10 incorporating the present invention. In the embodiment shown, trench 16 has a light-emitting diode(s) 40 on one side, and a multiple clement photodetector 42 on the other side. By having the multiple element photodetector be able to detect separately when light impinges on different elements of it, the movement of a finger can be traced through a translucent or transparent trench wall. The LEDs are controlled by a microcontroller 44, which also monitors the detector signals.

The microcontroller also provides control signals to a speaker 46, for providing feedback sounds, such as a clicking sound, synchronized with the movement of a finger through trench 16. By including speaker 46 in the mouse, the latency of sending signals to the computer, and having the computer generate sounds through speakers connected to the computer, is avoided. This provides a more realistic, real-time feedback to the user. The desired clicking sound can be simply generated by the microprocessor using an appropriate square wave output to the speaker, which is simply a series of high and low output levels. The simplest implementation is a single high/low or low/high transition.

FIG. 4 also illustrates other standard components of a typical mouse, including a ball 48. Biased against ball 48 arc rollers 50 and 52 which have attached slotted wheels 54 and 56, respectively. The slotted wheels pass between emitter/detector pairs 58 and 60, respectively. Alternately, another pointing sensor could be used, such as the optical sensors available from Agilent or others. Finally, FIG. 4 shows multiple switches 62 which are activated by the buttons on a mouse. The communications to a host computer can be done over a serial interface 64, or with a wireless transmission.

Multiple Electrode Arrangements

Figure 5A:
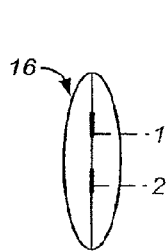
FIGS. 5A-5C illustrate different electrode arrangements according to embodiments of the invention.

FIG. 5A is a top view of trench 16 of FIG. 1, illustrating a two electrode embodiment. Two electrodes, designated 1 and 2, are shown. In this embodiment, the capacitive coupling of a finger to the electrode can be detected. By detecting which electrode is contacted first, it can be determined in which direction the finger is moving. This can be used to scroll or zoom in or out in the appropriate direction on the computer. Alternate uses of the movement of the finger may also be used.

Figure 5B:
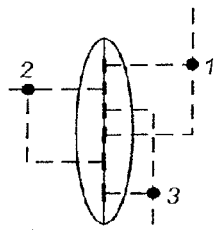

FIG. 5B shows an alternate embodiment using multiple electrodes in a repeating pattern. As shown, the first and fourth electrodes are connected together as electrode 1. The second and fifth electrodes are number 2, and the third and sixth are number 3. This arrangement provides for more preciseness, while limiting the number of electrodes, and thus the amount of wiring needed to connect to the electrodes on the sensor.

Figure 5C:
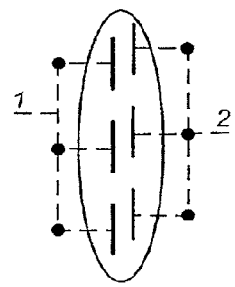

FIG. 5C shows yet another alternate embodiment, in which multiple electrodes are connected to only two wires, to form connected electrodes 1 and 2. As shown, the electrodes overlap in a vertical direction, so that a user's finger will contact electrode number 2 before leaving electrode number 1. The movement of the finger generates two signals in quadrature, from which the direction is determined from the sign of the phase shift. A more detailed description of such a quadrature detection can be found in U.S. Pat. No. 5,680,157. The varying amount of voltage detected on a particular electrode shows the direction of movement, and can support a more fine-tuned determination of where the finger is, especially in the area that would be between electrodes in the other embodiments. The inventors have discovered, however, that the embodiment of FIG. 5A, the simplest, is sufficient for many applications.

Figure 5D:
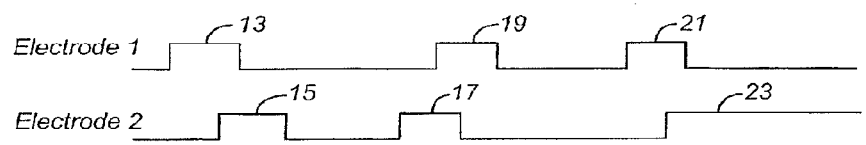
FIG. 5D is a waveform diagram of a sensor output for an electrode arrangement as shown in FIG. 5A.

FIG. 5D illustrates example waveforms generated from the touching of electrode 1 and electrode 2 of FIG. 5A. The waveforms would be the output of a comparator 34 in FIG. 6 below, for example. A first pulse 13 shows the finger in contact with the first electrode, with the rising edge corresponding to when the finger first touches the electrode, and the falling edge corresponding to when the finger leaves the electrode. The same applies for pulse 15, corresponding to the second electrode. Note that there is some overlap, and that the direction of finger movement can be determined from which electrode is contacted first (alternately, or in addition, which electrode the finger leaves last). Pulses 17 and 19 illustrate the finger moving in the other direction. Pulses 21 and 23 illustrate the finger remaining on the second electrode after moving, which can be used to provide a continued scrolling in the same direction.

In the embodiments above, the dedicated surface for sensing is typically located in place of the wheel, though other locations can be envisaged, for example below the thumb rest position. In one implementation, a number of sensitive electrodes are inserted, or molded over the sensitive surface. While the minimum number of electrodes is two, a larger number can be used in order to accommodate for a large sensitive area. In one implementation, finger movement indicative of the user desire to scroll is detected by an appropriate succession of on-off and off-on transitions in the electrodes, all with a relative phase shift consistent with the physical locations on the surface. In addition, speed constraints can be enforced by measuring the rate of electrode transitions, allowing for example, the discarding of excessively slow scrolls while improving on reliability, or allowing the application of larger document scrolls for movements at large speeds. The electrodes shape and spacing are matched to the finger dimension for comfort and detection robustness.

Connecting the electrodes with a period N creates a spatially periodical sensitive structure allowing a reduction in the electronics by a factor in the order of N, thus allowing larger sensitive surface at same cost. Typically, N is 3 to 4 but a value N of 2 is also possible if a gap is foreseen between each electrode pair and if there is a degree of spatial overlap within an electrode pair.

Capacitive Detection Circuit

Figure 6:
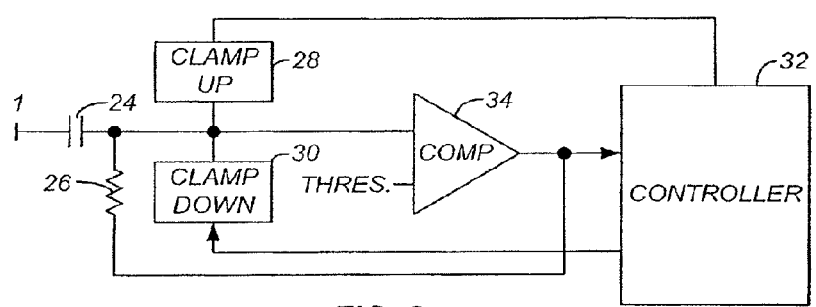
FIG. 6 is a block diagram of a capacitive detection circuit in one embodiment of the invention.

FIG. 6 is a block diagram of the capacitive detection circuit connected to each electrode. In the example shown, an electrode 1 is connected to a sensing capacitor 24 and a pull-up/pull-down resistor 26. In practice, the capacitor may be simply a gap in the wiring to the electrode. This gap can be created in a number of ways. A Mylar (Dupont's trademark for polyester foil) sheet can be used as a dielectric between the wiring connection and the electrode. This provides a well characterized dielectric, with a well characterized thickness, wedged between the conductor's terminal and the electrode, so that the resulting capacitance is well determined in spite of differences in tolerances during manufacturing. A flexible PC board could be used, with the flexible substrate itself causing the gap, i.e. the dielectric, between the electrode and the wiring. In one embodiment, the gap is about 50 microns, although the gap used can vary widely depending on the dielectric, etc. In one embodiment a wire is simply not stripped after it is cut, leaving its insulation intact up to the end. Then it is inserted through a hole in the electrode that has the same diameter as the insulation's external diameter. Or the electrode may be made of two pieces that are assembled around the insulated wire so that this is surrounded by the electrode. This makes a cylindrical or tubular capacitor at no material cost, where the wire jacket is the dielectric.

A clamp-up circuit 28 and clamp-down circuit 30 allows the node to be connected to the supply voltage or ground, respectively. These clamp circuits are under the control of a controller 32. The controller can thus clamp the voltage low, and then measure the time for the capacitor to charge up. Alternately the voltage can be clamped high, and then, after releasing the clamp, the time for the voltage on the capacitor to discharge can be measured. The voltage on the capacitor is provided as one input to a comparator 34, which compares to a voltage threshold, and provides an output to controller 32. The operation of the circuit and the theory behind it will be described in more detail below. Other implementations are possible, rather than using discrete components, such as an ASIC or the standard I/O of a microcontroller having a built-in comparator, or even using the inherent voltage threshold level of one of its input buffers.

In one embodiment, the driver for an I/O pin in a microcontroller can be used as a clamp-up or clamp-down circuit. An input buffer of the microcontroller could be used as the comparator. Such a design may not be as accurate, but could be sufficiently accurate, and would reduce the number of components and thus the cost. The comparator could be any circuit which performs a comparing function, including an appropriately configured amplifier. The comparator need not have two inputs, but could use an internal node for the threshold.

FIGS. 7A and 7B illustrate the conceptual operation of an embodiment of the capacitive detection of the present invention. A capacitive sensor is generally intended to detect the presence of an object when it is closer to a given distance, i.e. when either the capacitance of one electrode to the earth ground or the mutual capacitance between two electrodes of the sensing circuitry reaches a given value (threshold).

This working principle is not practical when it comes to implement a touch sensing function. The threshold would have to be carefully adjusted so that it would be reached at the same time as the finger touches the surface of the sensor. Therefore an easier approach has to be adopted where the contact of the linger leads to a clear step in capacitance, much easier to detect, possibly without any adjustment.

The solution in one embodiment of the invention consists in building a galvanic sensor, shown in FIGS. 7A and 7B, where the finger comes in contact with one armature of a built-in sense capacitor 66, thus pulling it to the earth ground through the existing body to ground capacitance 68 that comes in series (contact is illustrated by "switch" 72, representing contact by a user's finger). Provided that the built-in capacitor has a much lower capacitance than the body to ground coupling (which ranges from 100 to 500 pF), the contact can easily be detected by a capacitive sensing circuitry 70, in the form of the sudden "apparition" of the built-in capacitor when the user touches its external armature. The rest of the time, when nothing touches the galvanic sensing area, the built-in capacitor remains "invisible" for the rest of the electronics. Please note that the sensing capacitor preferably is as close as possible to the sensing electrode, so that no significant parasitic capacitance is present between the discrete capacitor and the electrode, which would make the sensing capacitor "always visible" thus ruining the touch sensing function. In one embodiment, the "discrete" capacitor 66 is simply a gap within the connection from the electrode to the circuit board containing the sensor circuit 70.

There are several ways of making capacitive sensing circuitry 70, from the simplest and cheapest RC charge or discharge time measurement to the most complicated tuned oscillator or filter system. One simple embodiment uses a free running RC oscillator where C is the sensing capacitor and a microcontroller repetitively counts the oscillation periods that occur during a given time window. A decrease in the number of counted periods by at least a given value means a finger has been placed on the electrode, while a minimal increase of accumulated counts is interpreted as the finger having been released from the electrode. No adjustment is needed; only the minimal difference of counts is to be set in accordance with the value of the capacitor used as the sensing element.

Another embodiment, instead of relying on RC exponential charging, uses a current source instead of a resistor, to give linear voltage ramps. With linear voltage ramps, a dual-ramp compensation scheme can be effective (see discussion below). A linear ramp allows compensation for large perturbations, and allows for more flexibility in threshold distance from the starting voltage.

Another embodiment uses an inexpensive solution, although this unfortunately suffers from bad noise immunity, especially against mains supply, which may be present in a large amount on the human body we want to detect. These low frequency signals are not well drained to earth ground through the 100 to max. 500 pF of the body to ground capacitance. We therefore prefer to get rid of the low frequency noise interference as much as possible, which will be described below.

In order to be able to implement these noise rejections we use a microcontroller, thus finally rending the simplest solution as effective as the most sophisticated ones, but still cheaper.

Basically, the embedded algorithm compares the RC time discharge to a reference time threshold in order to determine whether a finger is present or not. C is the sum of the inherent parasitic capacitance and the sensing capacitance, while R is the pull-up or pull-down resistor that drives the sensing line. The time threshold is automatically readjusted each time after the finger is detected as put on or released from the sensor, in order to compensate for the parasitic capacitances (which do not vary with the finger present or not). Only the time difference—the function of the minimal difference in capacitance we want to detect (4 pF or more)—is hard coded. Thus the system needs no factory adjustments.

FIG. 8 illustrates the principle used in an embodiment of the capacitive sensor 70 of the invention. FIG. 8 shows the elements of FIGS. 7A and 7B, with the galvanic contact switch 72 being the contact electrode 76 and Finger 78. Sensor 70 includes an optional protection resistor 80 in series to an input node 81 of a comparator 82. Node 81 is clamped to ground via a switch 84 for initialization. When switch 84 is open, node 81 is charged through pull-up resistor 86. This charging is done in a time determined by the time constant of resistor 86 and the capacitances 66 and 68, along with the parasitic capacitances as shown. In addition to parasitic capacitance 74, a parasitic capacitance 88 is shown. The threshold at the second input of comparator 82 is set to two thirds of the supply voltage, Vcc. FIG. 8 also shows protection diodes between ground and node 81, and between Vcc and node 81, respectively. Other thresholds could be used depending on the embodiment. ⅓ and ⅔ are only illustrative. If the thresholds are the same amount above and below the low and high supply voltages, the same time period can be achieved for discharging and charging. However, the thresholds could be different amounts from the supply voltages, and simply require an adjustment to take into account the difference in the discharge and charge times.

Figure 9:
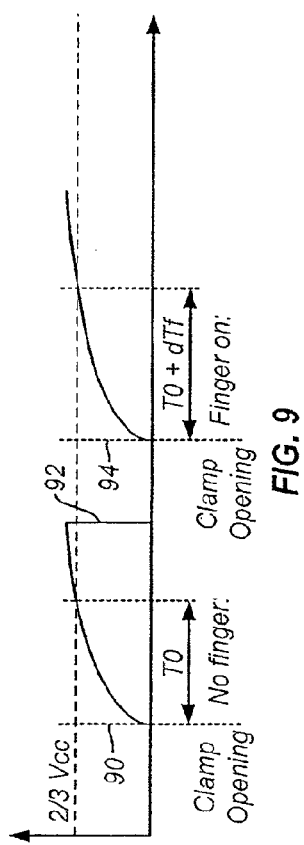
FIG. 9 is a timing diagram illustrating the operation of the circuit of FIG. 8.

FIG. 9 illustrates the timing for both a no finger condition, and a finger condition. Clamp 84 is first closed, to bring the voltage down to ground, or zero. When the clamp is opened at a time 90, node 81 charges up to the ⅔ threshold within a time T0. Node 81 is then grounded again at a time 92, and the switch is opened again at a time 94. At this point, a finger is on, adding capacitance, and lengthening the tune required for the threshold to be reached to time T0+dTf.

Figure 10:
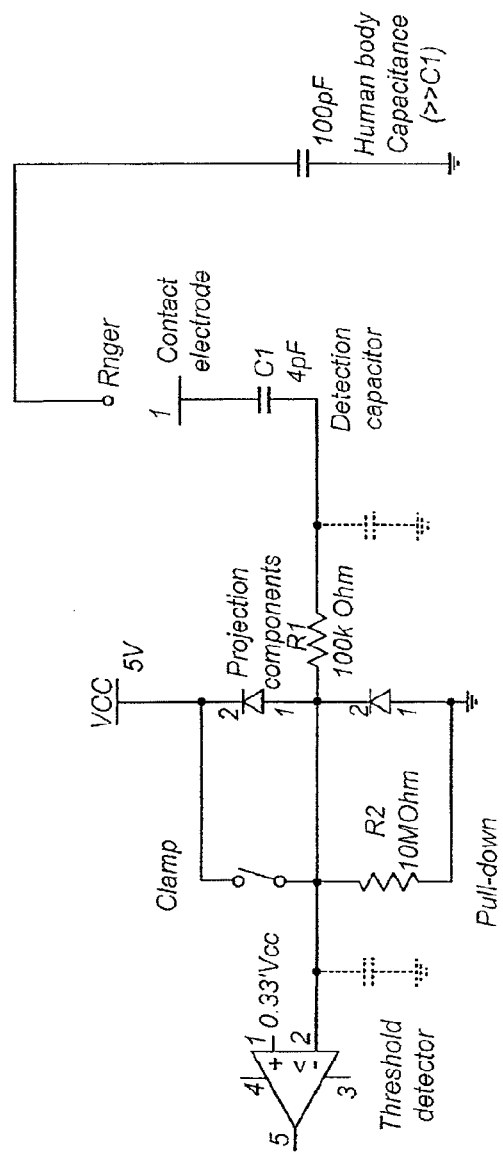
FIG. 10 is a circuit diagram illustrating a capacitive sensing circuit with a clamp-up.

FIG. 10 illustrates a similar circuit, but instead is showing the amount of time required for an input node to the comparator to be lowered from a high voltage to below a threshold. The threshold here is one-third of the supply voltage Vcc. In this example, the node is clamped to the supply voltage, and then is allowed to discharge to ground through a resistor R2. Otherwise, the circuitry is basically the same as that shown in FIG. 8, including the use of protection diodes between ground and node 81, and between Vcc and node 81, respectively.

Figure 11:
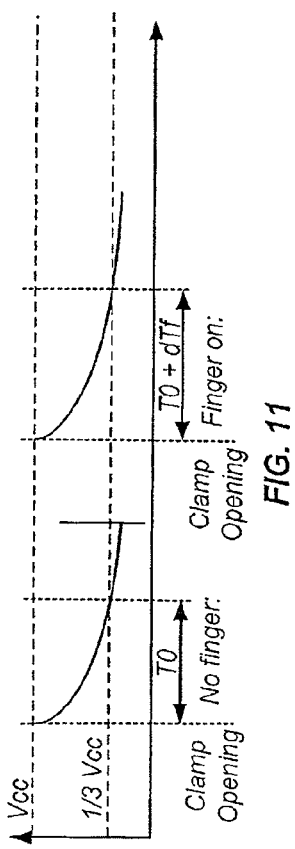
FIG. 11 is a timing diagram illustrating the operation of a circuit of FIG. 10.

FIG. 11 illustrates the timing with no finger and with the finger, showing again that a longer time is required to discharge the capacitance when the finger is on the sensor.

Figure 12:
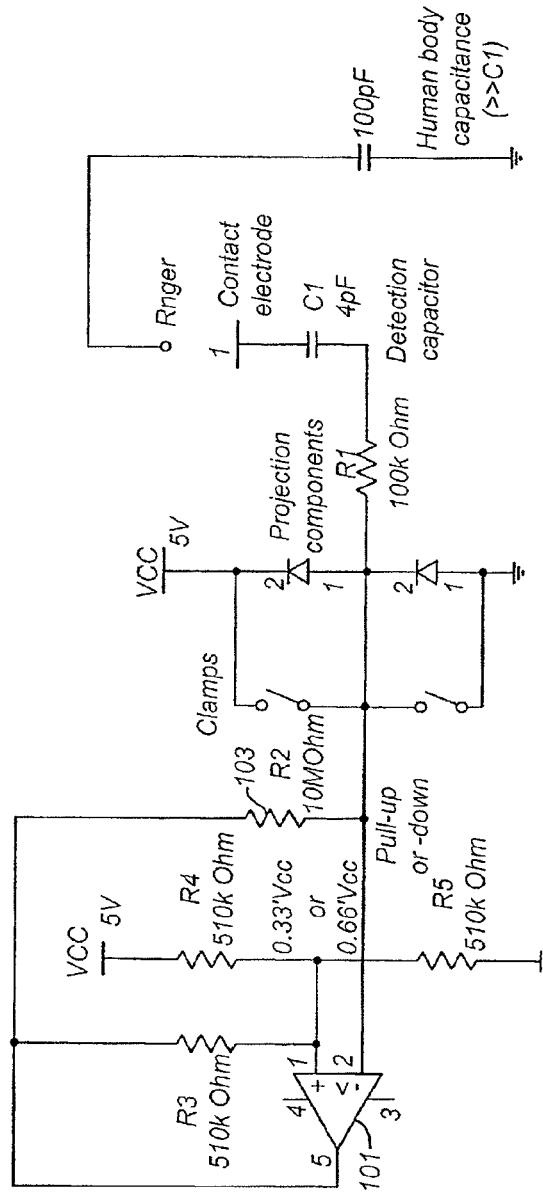
FIG. 12 is a diagram of a capacitive sensing circuit having both clamp-up and clamp-down capability.

FIG. 12 illustrates essentially a combination of the two approaches of FIGS. 8 and 10. Since the output of comparator 101 will either be high or low from the previous cycle, this output can be used to both be the source for pulling up (logic 1 output) through resistor 103, or pulling down (logic 0 output) through the same resistor. Also, the same output can be fed back to set the threshold, using resistors R3, R4 and R5. The threshold is set to 0.66 Vcc for a logic 1 output, and to 0.33 Vcc for a logic 0 output, using the save resistors.

The arrangement of FIG. 12, shown in more detail in FIG. 16 below, uses two clamps, allowing the capacitor to alternately charge up from ground, or discharge from the supply voltage. By using both, interference, such as from the power supply frequency, can be reduced, as explained below.

Figure 13:
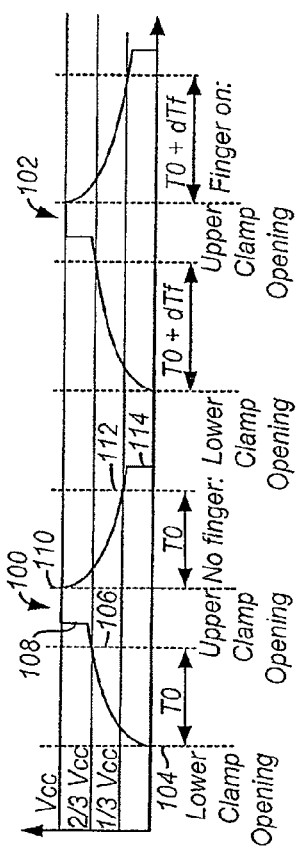
FIGS. 13, 14, and 15 are timing diagrams illustrating the operation of the circuit of FIG. 12.

FIG. 13 illustrates a capacitor charge and discharge cycle with no finger (100), and a charge and discharge cycle with a finger on the contact electrode (102). With no finger, the input node to the comparator is clamped to ground, and the lower clamp is opened at a point in time 104. The capacitance charges up until it crosses the upper threshold at a point in time 106, triggering the comparator output. Subsequently, the node is clamped high at a point in time 108, and then the chump is opened at a point in time 110 to provide a discharge cycle. At time 112, the lower threshold is crossed, again triggering the comparator output. The voltage is then clamped down to zero again at a point 114, and the cycle repeats. During the second cycle illustrated by curves 102, a finger is on, and the times will be different, resulting in a longer charging time and longer discharging time. In one embodiment, cycle 102 is two milliseconds after cycle 100. Although T0 is shown as the same for the rising and falling (charging and discharging) times, this is not necessary.

Figure 14:
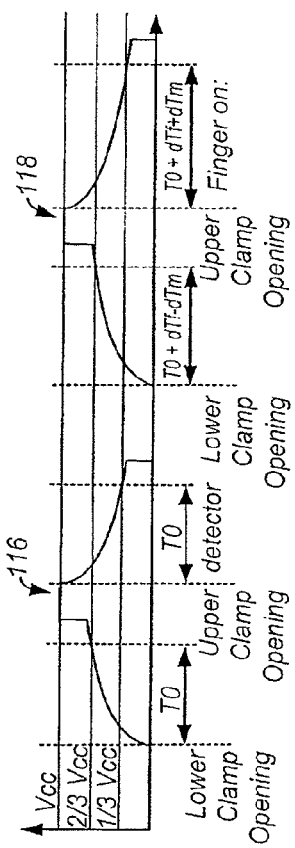

FIG. 14 illustrates a curve 116, similar to the curve 100, when no finger is oil the electrode. Curve 118 illustrates a finger on, with the addition of noise interference represented by dTm. Thus, as shown, the charge up time will be T0+dTf−dTm, where T0 is the time without a finger, dTf is the additional time caused by the finger, and dTm is the noise interference. During a discharge cycle, the components are the same, except in this instance the interference is an additive term. Thus, by combining the two and using a sum result, the noise will cancel out. If the delay from the rising to the falling ramp is short compared to the period of the main power supply frequency, the interference will be the same on both ramps.

Figure 15:
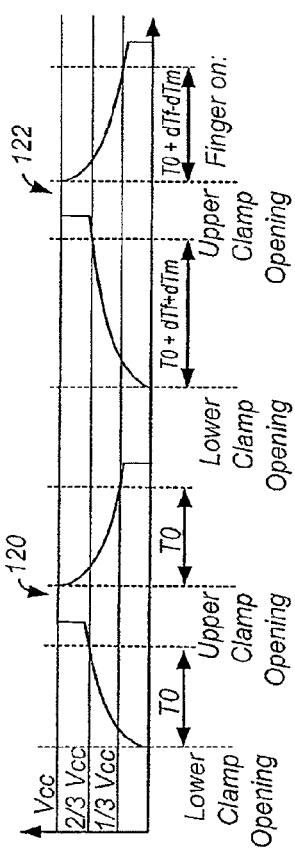

FIG. 15 illustrates another example, again showing a curve 120 with no finger, and a curve 122 with the finger on. In this instance, the noise is additive during the capacitive charging, and subtractive during capacitive discharging, with the same effect of canceling out when the two are combined.

Figure 16B:
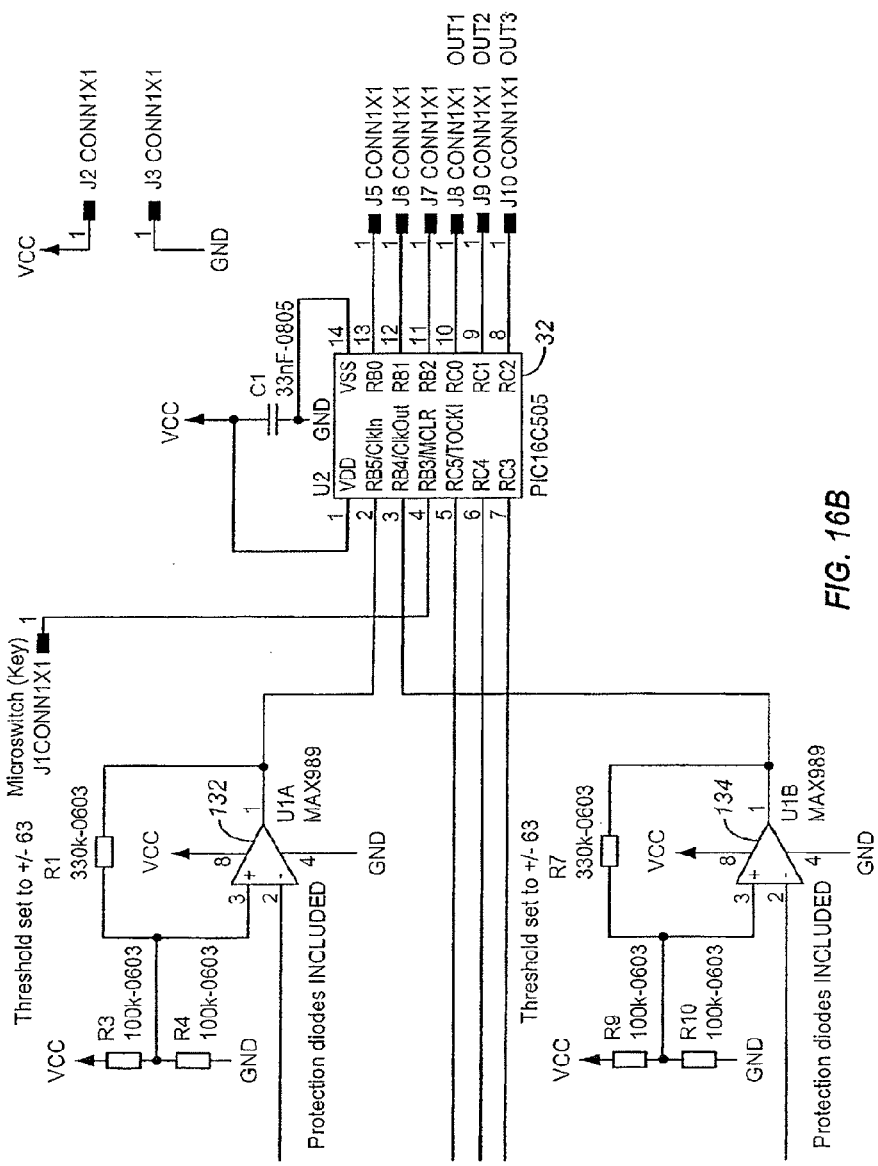
FIG. 16 is a diagram of a capacitive sensing circuit according to an embodiment of the invention.

FIG. 16 is a circuit diagram illustrating a capacitive sensing circuit, such as shown in block form in FIG. 4 and in FIG. 12. FIG. 16 has two inputs, 130 and 131. These correspond to two separate electrodes, each with their own capacitance connected. Input 130 is connected to one input of a comparator 132, while input 131 is connected to an input of comparator 134. Each of the comparators provides an output to microcontroller 32. The other input of each of the comparators is connected to a resistive circuit for setting the threshold. The threshold is set using feedback from the output of the comparator. Thus, when the output of the comparator is a 1, the threshold will be set one-third below the supply voltage, or at a level of 0.66. When the output of the comparator is zero (with the output being determined by the last transition) the feedback puts the threshold at one-third above ground, or 0.33.

Turning to the first input 130, this is initially clamped low by an output from microcontroller 32 on line 136 through a resistor 138 and transistor 140. The same output line 136 is connected to a similar low clamp for electrode 131. When the low clamp is released, the capacitance connected to input 130 will charge up through a pull-up resistor 142 with a high level value on line 144 as output by controller 32. A similar pull-up resistor is used for the circuit for input 131. After the threshold is passed and the comparator toggles, the next cycle begins with the input 130 being clamped high through a control signal on line 146, through resistor 148 to transistor 150, which clamps input node 130 high. The same control line 146 controls a clamp-up transistor for the circuit attached to input 131.

Figure 17:
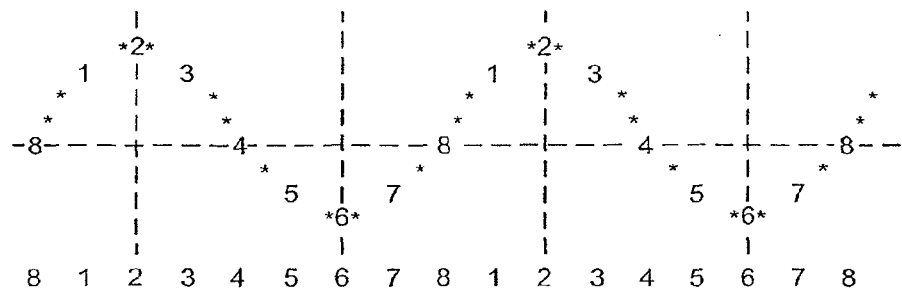
FIG. 17 is a timing diagram illustrating sampling in pairs during a period of the power supply frequency.

FIG. 17 illustrates a second aspect of this embodiment of the invention, which further reduces interference by how measurements are done compared to a frequency cycle of the main power supply, as illustrated. The successive (dual-ramp) time measurements are added and evaluated in groups in such a way that the remaining influence of the mains is further attenuated, by means of a naturally subtractive effect.

In order to achieve this, the evaluation is performed at a rate as close as possible to the mains period (or a plain multiple of its period) during which an even number of periodic time measurements are performed. When making the periodic sum or average of these individual time measurements, the influence of the mains is slightly attenuated pair by pair among the samples when added. This principle is illustrated in FIG. 17 for the case of eight measurements equally distributed in time during the mains period.

Thus, for example, measurement pairs 1 and 5 would be combined for a measurement value, rather than simply looking at 1 or 5 alone. Since 5 is at a negative portion of the main supply frequency cycle corresponding to the positive portion of sample 1, the combination should make the contribution from the interfering power supply zero. Similarly, by picking samples 2 and 6, 3 and 7, or 4 and 8, the interference from the main power supply is further canceled out. This interference in particular can be picked up by the human body and reflected in the capacitance generated by the finger contact.

The average mains period is taken as 18 ms (FU 20 ms & USA 16.67 ms). It covers 9 samples, but one is the first of the next evaluation period, therefore 8 samples (four pairs) shall last 15.75 ms. Thus, in the case of eight measurements per mains period, the sampling period is 2.25 ms.

As for the evaluation rate, it may be faster than one per mains period in order to improve the reaction time of the sensing elements. As long as each evaluation covers the mains period, it may well be performed more often that once per mains period, in fact it can be done up to each time a new measurement is performed (sliding window principle).

Figure 18:
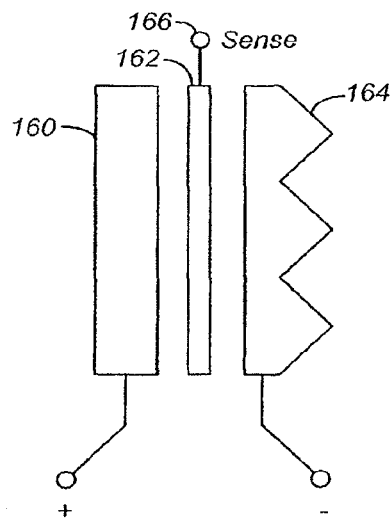
FIG. 18 is a diagram of an alternate sensor with a single-ended, zigzag electrode.

FIGS. 18-23 illustrate another embodiment of an electrode for sensing finger capacitance according to the invention. FIG. 18 shows three electrodes, 160, 162, and 164. 160 and 164 are provided with positive and negative signals (signals in phase opposition), from which the electrode 166 can sense more or less of each one, as a function of the finger's position. Sensing is done on a node 166 connected to electrode 162. Electrode 164 has a sawtooth on one side, producing a modulated electrode. In the example of FIG. 18, this sawtooth is one-sided.

Figure 19:
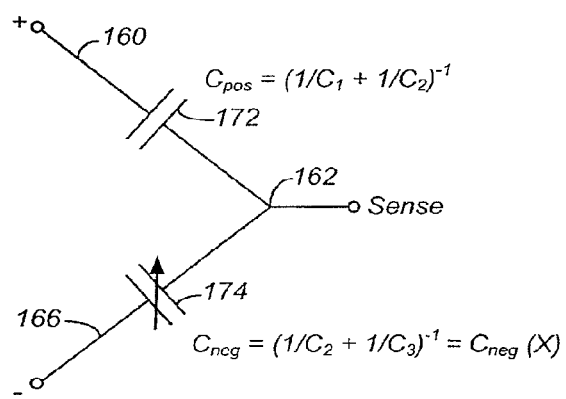
FIG. 19 is an equivalent circuit for the embodiment of FIG. 18.
Figure 20:
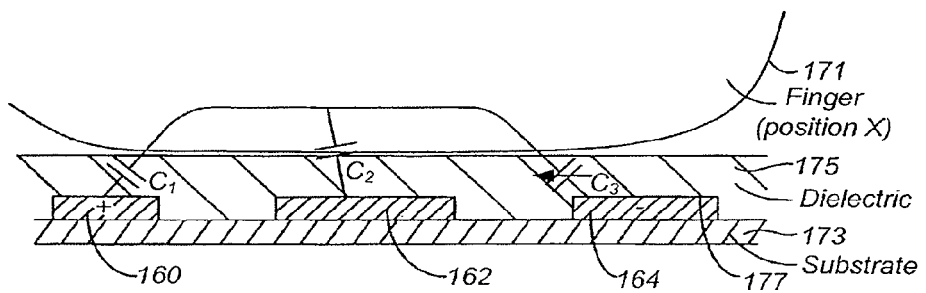
FIG. 20 is a cut-away, cross-sectional view of a finger on the electrodes of FIG. 18.

FIG. 19 shows the equivalent circuit diagram, with two capacitors 172 and 174, whose value is varied by the location of the finger. By measuring a current or injected charge into the sense node, the imbalance of the capacitance can be determined with positive and negative signals that are 180° shifted. Referring to FIG. 20, a cut-away view is shown of a finger 171 with capacitances C1, C2 and C3 to electrodes 160, 162 and 164, respectively.

The electrodes are on a substrate 173 and are covered by a dielectric 175. The shown capacitances combine to form capacitances 172 and 174 as shown by the formulas in FIG. 19. A dotted line 177 in FIG. 20 illustrates the varying width of electrode 164 due to its sawtooth shape.

Figure 21A:
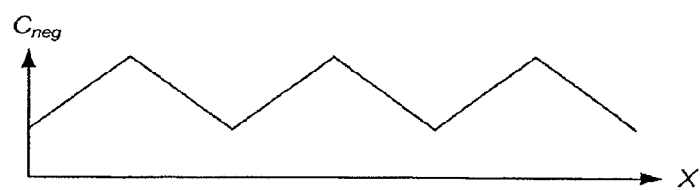
FIG. 21A-C are timing diagrams illustrating the operation of the circuit of FIG. 18.
Figure 21B:
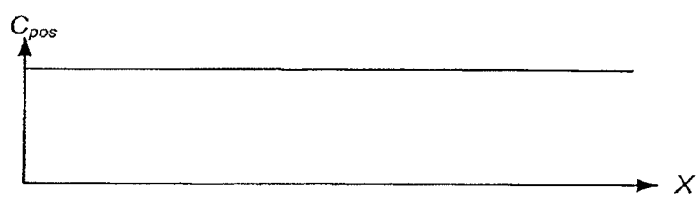
Figure 21C:
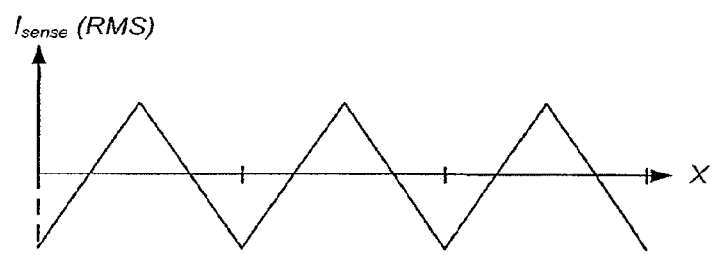
Figure 22:
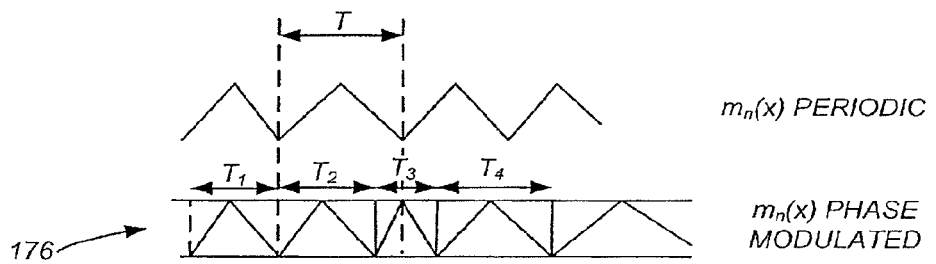
FIG. 22 is a timing diagram illustrating the use of phase modulation for the circuit of FIG. 18.

FIGS. 21A-C illustrate the modeling of Cpos and Cneg as a function of X (distance of movement of the finger). The amount of effective coupling when the finger partially covers the linear electrodes depends on the size of the finger. A purely periodic modulation with period T will not be detected if the finger dimension is a multiple of W. In order to avoid this rare effect, the modulation M(X) of the sawtooth is a phase modulated signal with ideally random modulation, or at a very low frequency, such as the phase-modulated signal 176 in FIG. 22. The sensing current can be measured synchronously, or any other method.

By detecting zero crossings, peaks (maximum or minimum), an indication of the finger movement by movement of T is possible (or the phase-modulated value of T).

Figure 23:
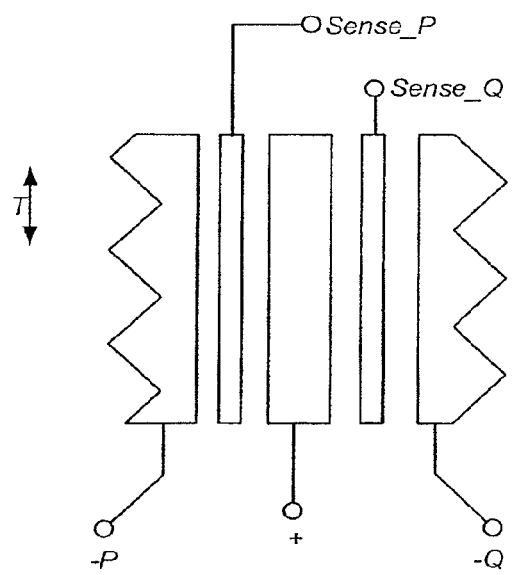
FIG. 23 is a diagram illustrating the embodiment of FIG. 18 using a quadrature stricture.

Detection of the sign, or direction of finger movement, can be determined using a quadrature structure such as shown in FIG. 23. By quadrature decoding of the sensing signals, the sense_P and sense_Q signals can yield the movement direction. In the example of FIG. 23, with a separation of the outer electrodes of less than 4 mm, with T=1 mm, a 30 mm pad, of width 4 mm, could possibly obtain a resolution of 1%. Sense_P and sense_Q are excited and read out alternately in a time-multiplexed sequence in order to prohibit excitation and coupling from the other phase (Q, respectively P).

Resistive Pad

In another implementation, a single dimension resistive pad, using for example the force sensing resistance technology by Interlink, is used as the sensitive region. By computing the resistance between the current injecting node and the contact points at opposite ends of the pad, both position of finger and pressure of finger can be extracted. A change of position by a given, and possibly programmable, relative amount will trigger the document scrolling up or down by n lines. Finger pressure information can also be used for other functions such as scrolling factor, zoom factor, or others. For example, a movement with high pressure will result in a large document scroll, while a small pressure movement will scroll the document very slowly.

Fingerprint Sensor

In a last implementation, optical detection is used to detect the finger movement. The finger is in contact wish a transparent window while being illuminated by a light source. High-contrast fingerprints are obtained thanks to frustrated total internal reflection; the fingerprints are then imaged onto a linear photosensitive array. Cross-correlation between a reference (initial) fingerprint image and the currently measured fingerprint image indicates the amount of movement that occurred since the reference image was taken. When enough movement is registered, the currently measured fingerprint image is used as the reference image for the next cross-correlation computations. Alternatively, the photoarray/correlation system can be replaced by a position sensing device (psd), a component delivering the position of a light spot over a linear array. In this last implementation, the light spot is simply the portion of the finger that is illuminated by the light source and imaged onto the psd-position sensing device.

Tactile or Sound or Visual Feedback

In all systems, the solid-state roller is enhanced with feedback. Tactile feedback is obtained by embedding either texture or periodical profile onto the sensitive area. The embedded texture/profile has amplitude and spatial frequency content matched to the 3D tactile perception of a finger moving at typical scrolling speed (3D relates to spatial perception+temporal–that is, moving—perception). Sound feedback is obtained by generating one or more "click" sounds whenever a movement creates a document scroll by one or more lines. The sound is provided through a speaker in the mouse itself, avoiding the delay involved in requesting the computer to generate sound. The sound can be generated by simply connecting an output of a controller to the speaker, with each rising or falling edge creating a click sound.

Similarly, visual feedback is applied by switching on a LED or other light source whenever a scrolling movement is registered. In one embodiment, a light used in the pointing device for decorative purposes can he flashed to indicate a notification to the user. One example would be an event being monitored by the user externally to the computer system, such as over the Internet, with the flashing light in the pointing device prompting the user.

Finally, in units implementing vibration/force feedback mice such as iFeel mice by Logitech, vibration/force feedback can be applied, typically in form of a vibration/force impulse of short duration, for each scrolling movement.

Scrolling Speed, Scroll Repeat

In one embodiment, the speed of a transition of the finger from one electrode to another is measured by the controller in the pointing device. Depending on the speed, the controller can send a report to the mouse driver in the host computer indicating 1, 2, 3 or 4 transitions. Thus, for example, a fast movement between just two electrodes can cause a 4 line scroll. By doing this determination in the mouse, rather than the driver software, only a single transition between two electrodes is needed to determine speed, rather than multiple transitions. This allows for faster response time to the desired scroll speed, and also allows the function to be implemented with only two electrodes on the mouse.

Fatigue generated when scrolling a large document can be avoided by using the scroll-repeat feature of the invention. After an initial scroll, defining both the scroll direction and amplitude, a scroll-repeat can be activated simply by letting the finger rest in the movement final position without lifting the finger at end of movement. Typically, the scroll-repeat function is activated after half a second latency time of letting the finger remain in this position. Both the latency and rate of scroll-repeat can be programmed to adjust to the user taste. Additionally, for implementations providing indication of linger pressure—the fsr pad or the pressure measuring electrode touch sensing-, the scroll-repeat rate can be continuously varied as desired by the user, under control of its finger pressure, until the scrolling finger is released. In one embodiment, the scroll repeat function is implemented in the controller in the pointing device. Upon detection of a scroll movement followed by the finger resting on an electrode for more than a threshold amount of time, the controller will continuously provide scrolling reports to the computer.

All of the above solid-state implementations of a roller improve on the current roller wheel in that they offer a better robustness to dirt and shocks. Some implementations also offer a very compact subsystem allowing new form factors and ergonomic shapes. The sensitive surface is designed so that the finger is guided over a trajectory allowing reduced strain, thus allowing for extended usage of the scrolling function. Fatigue can be further reduced by activating the scroll-repeat function with rate controlled by finger pressure.

As will be understood by those of skill in the art, the present invention may be embodied in other specific forms without departing from the essential characteristics thereof For example, the pointing device could be connected to a TV, game console, or other device, which would fall within the definition of "computer" as used herein. Accordingly, the foregoing description is intended to be illustrative, but not limiting, of the scope of the invention which is set forth in the following claims.

What is claimed is:

1. A pointing device comprising:
   a housing;
   a pointing sensor disposed in the housing, for detecting a physical displacement of the pointing device;
   a stationary scrolling sensor disposed in the housing, wherein the stationary scrolling sensor comprises:
   a plurality of discrete electrodes including a first electrode and a second electrode; and a capacitive sensing circuit; and a processor coupled to the capacitive sensing circuit, wherein the processor is operable to:
- detect a first contact between a user's finger and the first electrode;
- detect a second contact between the user's finger and the second electrode;
- wherein detecting the first contact or detecting the second contact further comprises detecting that a time to discharge a capacitance is longer than a reference time value;
- determine that a delay between the first contact and the second contact is less than a predetermined time period; and
- provide a scrolling command; and a transmitter disposed in the housing, configured to transmit the physical displacement and the scrolling command from the pointing device to a host device.

2. The pointing device of claim 1 further comprising a second plurality of discrete electrodes, wherein:
- the plurality of discrete electrodes is arrayed along a first direction; and
- the second plurality of discrete electrodes is arrayed along a second direction orthogonal to the first direction.

3. The pointing device of claim 2 wherein the plurality of discrete electrodes is associated with vertical scrolling and the second plurality of discrete electrodes is associated with horizontal scrolling.

4. The pointing device of claim 1 wherein detecting the first contact between the user's finger and the first electrode comprises detecting a ground contact to the capacitive sensing circuit.

5. The pointing device of claim 1 wherein the capacitive sensing circuit includes a first capacitive element, a second element connected to the first capacitive element, and a comparison circuit having an input node connected to the first capacitive element and the second element and operable to compare a voltage at the input node to a threshold voltage.

6. The pointing device of claim 1 wherein the scrolling command is provided based at least in part on an order in which the user's finger is detected in contact with the first electrode and the second electrode.

7. The pointing device of claim 6 wherein a scrolling direction is determined at least in part on the order in which the user's finger is detected in contact with the first electrode and the second electrode.

8. The pointing device of claim 1 wherein the processor is further operable to provide an indication of a number of times to repeat the scrolling command.

9. The pointing device of claim 8 wherein the processor is further operable to determine a speed of the user's finger using the delay between the first contact and the second contact.

10. The pointing device of claim 9 wherein the number of times to repeat the scrolling command is based on the speed of the user's finger.

11. The pointing device of claim 1 wherein the plurality of discrete electrodes are coupled to the capacitive sensing circuit.

12. The pointing device of claim 1 wherein the capacitive sensing circuit further comprises a comparator.

13. The pointing device of claim 12 further comprising an AC power supply characterized by an AC frequency, wherein capacitance charging or discharging is faster than the AC frequency.

14. The pointing device of claim 1 wherein the capacitance sensing circuit further comprises an oscillator.

15. The pointing device of claim 1 wherein the pointing sensor is an optical sensor configured to detect movement of the pointing device in relation to a surface.

16. The pointing device of claim 1 further comprising a feedback device configured to provide feedback to the user's finger.

17. The pointing device of claim 16 wherein the feedback device is configured to provide feedback to the user's finger when the delay detected by the stationary scrolling sensor between the first contact and the second contact is less than the predetermined time period.

18. The pointing device of claim 16 wherein the feedback is one or more of a haptic feedback, an audio feedback, and a visual feedback generated by the feedback device.

19. The pointing device of claim 18 wherein the haptic feedback is a vibration generated by the feedback device.

20. The pointing device of claim 18 wherein the haptic feedback is a force impulse generated by the feedback device.

21. A pointing device comprising:
a housing;
a pointing sensor disposed in the housing, for detecting a physical displacement of the pointing device;
a stationary scrolling sensor disposed in the housing, wherein the stationary scrolling sensor comprises:
- a plurality of discrete electrodes including a first electrode and a second electrode; and
- a capacitive sensing circuit, wherein the capacitive sensing circuit further comprises a comparator;

an AC power supply characterized by an AC frequency, wherein capacitance charging or discharging is faster than the AC frequency; and a processor coupled to the capacitive sensing circuit, wherein the processor is operable to:
- detect a first contact between a user's finger and the first electrode;
- detect a second contact between the user's finger and the second electrode;
- determine that a delay between the first contact and the second contact is less than a predetermined time period; and
- provide a scrolling command; and a transmitter disposed in the housing, configured to transmit the physical displacement and the scrolling command from the pointing device to a host device.

22. The pointing device of claim 21 further comprising a second plurality of discrete electrodes, wherein:
- the plurality of discrete electrodes is arrayed along a first direction; and
- the second plurality of discrete electrodes is arrayed along a second direction orthogonal to the first direction.

23. The pointing device of claim 22 wherein the plurality of discrete electrodes is associated with vertical scrolling and the second plurality of discrete electrodes is associated with horizontal scrolling.

24. The pointing device of claim 21 wherein detecting the first contact between the user's finger and the first electrode comprises detecting a ground contact to the capacitive sensing circuit.

25. The pointing device of claim 21 wherein the capacitive sensing circuit includes a first capacitive element, a second element connected to the first capacitive element, and a comparison circuit having an input node connected to the first capacitive element and the second element and operable to compare a voltage at the input node to a threshold voltage.

26. The pointing device of claim 21 wherein the scrolling command is provided based at least in part on an order in which the user's finger is detected in contact with the first electrode and the second electrode.

27. The pointing device of claim 26 wherein a scrolling direction is determined at least in part on the order in which the user's finger is detected in contact with the first electrode and the second electrode.

28. The pointing device of claim 21 wherein the processor is further operable to provide an indication of a number of times to repeat the scrolling command.

29. The pointing device of claim 28 wherein the processor is further operable to determine a speed of the user's finger using the delay between the first contact and the second contact.

30. The pointing device of claim 29 wherein the number of times to repeat the scrolling command is based on the speed of the user's finger.

31. The pointing device of claim 21 wherein the plurality of discrete electrodes are coupled to the capacitive sensing circuit.

32. The pointing device of claim 21 wherein detecting the first contact or detecting the second contact further comprises detecting that a time to discharge a capacitance is longer than a reference time value.

33. The pointing device of claim 21 wherein the capacitance sensing circuit further comprises an oscillator.

34. The pointing device of claim 21 wherein the pointing sensor is an optical sensor configured to detect movement of the pointing device in relation to a surface.

35. The pointing device of claim 21 further comprising a feedback device configured to provide feedback to the user's finger.

36. The pointing device of claim 35 wherein the feedback device is configured to provide feedback to the user's finger when the delay detected by the stationary scrolling sensor between the first contact and the second contact is less than the predetermined time period.

37. The pointing device of claim 35 wherein the feedback is one or more of a haptic feedback, an audio feedback, and a visual feedback generated by the feedback device.

38. The pointing device of claim 37 wherein the haptic feedback is a vibration generated by the feedback device.

39. The pointing device of claim 37 wherein the haptic feedback is a force impulse generated by the feedback device.

40. A system comprising:
   an electronic device comprising a first processor and a housing;
   a pointing device sending data to the electronic device; the pointing device comprising a pointing sensor and a stationary scrolling sensor, the stationary scrolling sensor comprising:
      a plurality of discrete electrodes including a first electrode and a second electrode; and
      a capacitive sensing circuit; and
      a second processor coupled to the capacitive sensing circuit, wherein the second processor is operable to:
         detect a first contact between a user's finger and the first electrode;
         detect a second contact between the user's finger and the second electrode;
         wherein detecting the first contact or detecting the second contact further comprises detecting that a time to discharge a capacitance is longer than a reference time value;
         determine that a delay between the first contact and the second contact is less than a predetermined time period; and
         provide a scrolling command.

41. The system of claim 40 wherein the pointing device is physically separate from the electronic device and sends data over a wireless network.

42. The system of claim 40 wherein the pointing device is physically separate from the electronic device but coupled to the electronic device by a wire, and the pointing device sends data to the electronic device over the wire.

43. The system of claim 40 wherein the pointing device is enclosed within the housing of the electronic device.

44. The system of claim 40 wherein the pointing sensor is an optical sensor configured to detect movement of the pointing device in relation to a surface.

45. The system of claim 40 further comprising a feedback device configured to provide feedback to the user's finger.

46. The system of claim 45 wherein the feedback device is configured to provide feedback to the user's finger when the delay detected by the stationary scrolling sensor between the first contact and the second contact is less than the predetermined time period.

47. The system of claim 45 wherein the feedback is one or more of a haptic feedback, an audio feedback, and a visual feedback generated by the feedback device.

48. The system of claim 47 wherein the haptic feedback is a vibration generated by the feedback device.

49. The system of claim 47 wherein the haptic feedback is a force impulse generated by the feedback device.

* * * * *